United States Patent
Byun et al.

(10) Patent No.: US 8,753,765 B2
(45) Date of Patent: Jun. 17, 2014

(54) SECONDARY BATTERY

(75) Inventors: Sangwon Byun, Yongin-si (KR); Sooseok Choi, Yongin-si (KR); Jeongwon Oh, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 339 days.

(21) Appl. No.: 13/187,344

(22) Filed: Jul. 20, 2011

(65) Prior Publication Data

US 2012/0237802 A1  Sep. 20, 2012

Related U.S. Application Data

(60) Provisional application No. 61/452,520, filed on Mar. 14, 2011.

(51) Int. Cl.
  *H01M 2/26* (2006.01)
(52) U.S. Cl.
  USPC .................. 429/161; 429/163; 429/164
(58) Field of Classification Search
  None
  See application file for complete search history.

(56) References Cited

U.S. PATENT DOCUMENTS

| | | | |
|---|---|---|---|
| 2,875,296 A * | 2/1959 | Enderli | 337/65 |
| 5,766,793 A | 6/1998 | Kameishi et al. | |
| 6,537,693 B1 * | 3/2003 | Suzuki et al. | 429/56 |
| 2010/0279156 A1 | 11/2010 | Kim et al. | |
| 2010/0323234 A1 | 12/2010 | Kim et al. | |
| 2011/0052949 A1 | 3/2011 | Byun et al. | |
| 2011/0183197 A1 | 7/2011 | Byun et al. | |

FOREIGN PATENT DOCUMENTS

| | | |
|---|---|---|
| CN | 1297260 A | 5/2001 |
| EP | 2 284 932 A1 | 2/2011 |
| JP | 9-106804 | 4/1997 |
| JP | 10-326610 | 12/1998 |
| JP | 11-7931 A | 1/1999 |
| JP | 2000-182598 | 6/2000 |
| JP | 2006-228520 | 8/2006 |

(Continued)

OTHER PUBLICATIONS

KIPO Office action dated Dec. 5, 2012, for corresponding Korean Patent application 10-2011-0085714, (5 pages).

(Continued)

*Primary Examiner* — Cynthia K. Walls
(74) *Attorney, Agent, or Firm* — Christie, Parker & Hale, LLP (57) ABSTRACT

Provided is a secondary battery including a fuse part that can continually function as a fuse. In the state where a first short circuit plate contacts a connecting plate to form a short circuit, even when heat generated from the short circuit melts the first short circuit plate, a second short circuit plate contacts the connecting plate to maintain a short circuit state, so that the fuse part can continually function as a fuse. The secondary battery includes an electrode assembly, a case accommodating the electrode assembly, a cap assembly including a cap plate sealing the case and having a short circuit hole, and a short circuit assembly including a first short circuit plate, a second short circuit plate, and a connecting plate. The first short circuit plate is disposed in the short circuit hole. The second short circuit plate contacts a lower part of the first short circuit plate. The connecting plate is spaced apart from the cap plate and is disposed outside the cap plate to cover the short circuit hole.

17 Claims, 5 Drawing Sheets

(56) References Cited

FOREIGN PATENT DOCUMENTS

| | | |
|---|---|---|
| JP | 2011-018645 | 1/2011 |
| JP | 2011-054561 | 3/2011 |
| KR | 10-2000-0073942 A | 12/2000 |
| KR | 10-2002-0021888 A | 3/2002 |
| KR | 2010-0137904 A | 12/2010 |
| KR | 10-1042808 B1 | 6/2011 |
| KR | 2011-0087567 A | 8/2011 |

OTHER PUBLICATIONS

KIPO Notice of Allowance dated Jun. 13, 2013, issued in KR Application No. 10-2011-0085714 (5 pages).

JPO Office action dated May 28, 2013, for corresponding Japanese Patent application 2011-203036, (4 pages).

Patent Abstracts of Japan, and English machine translation of Japanese Publication 10-326610, dated Dec. 8, 1998, listed above, (11 pages).

Patent Abstracts of Japan, and English machine translation of Japanese Publication 2000-182598, dated Jun. 30, 2000, listed above, (23 pages).

Patent Abstracts of Japan, and English machine translation of Japanese Publication 2006-228520, dated Aug. 31, 2006, listed above, (14 pages).

EPO Extended Search Report dated Feb. 29, 2012 for EP 11178239.7 (5 pages).

Machine English Translation of JP 11-7931 A (13 pages).

SIPO Office action dated Dec. 18, 2013, with English translation, corresponding to Chinese Patent application 201110267293.6, (10 pages).

* cited by examiner

SECONDARY BATTERY

CROSS-REFERENCE TO RELATED APPLICATION

This application claims the benefit of U.S. Provisional Application No. 61/452,520, filed on Mar. 14, 2011, in the United States Patent and Trademark Office, the disclosure of which is incorporated herein in its entirety by reference.

BACKGROUND

1. Field

Embodiments of the present invention relate to a secondary battery.

2. Description of Related Art

Secondary batteries are rechargeable, unlike primary batteries which are typically not rechargeable. Typical secondary batteries include a low capacity battery having a battery cell in the form of a pack and used in portable small electronic devices such as cellular phones and camcorders, and a high capacity battery including tens of battery packs connected to one another and used as a power source for driving a motor, e.g., of hybrid vehicles.

Secondary batteries are manufactured in various shapes such as a cylindrical shape and a prismatic shape. Electrolyte and an electrode assembly formed by inserting a separator as an insulator between a positive electrode plate and a negative electrode plate are installed in a case, and a cap assembly provided with electrode terminals is installed on the case, so as to form a secondary battery.

When a secondary battery is over charged, excessive heat is generated, or electrolyte is decomposed to increase the inner pressure of the secondary battery, and thus, the secondary battery may be burned or exploded. Accordingly, a secondary battery having high safety is needed.

SUMMARY

An aspect of the present invention provides a secondary battery including a fuse part that can continually function as a fuse. According to one aspect, when a first short circuit plate contacts a connecting plate to form a short circuit, even when heat generated from the short circuit melts the first short circuit plate, a second short circuit plate contacts the connecting plate to maintain a short circuit state so that the fuse part can continually function as a fuse.

A secondary battery includes an electrode assembly; a case housing the electrode assembly; a cap assembly sealing the case, the cap assembly comprising a cap plate; and a short circuit assembly including a first short circuit plate having an edge portion coupled to the cap plate; and a second short circuit plate having an edge portion coupled to the cap plate.

In one embodiment, the first short circuit plate has a round portion generally protruding towards an interior portion of the case and the second short circuit plate has a round portion generally protruding towards an interior portion of the case. Additionally, in one embodiment, the first short circuit plate is configured to protrude away from the inner portion of the case when an internal pressure of the secondary battery reaches a first threshold level and the second short circuit plate is configured to protrude away from the inner portion of the case when the internal pressure of the secondary battery reaches a second threshold level that is greater than the first threshold level.

In one embodiment, the first short circuit plate and the second short circuit plate contact each other and they overlap.

Further, in one embodiment, the cap plate has an opening and a stepped surface SS adjacent to the opening, and wherein the first short circuit plate and the second short circuit plate are on the stepped surface.

In one embodiment, the product of the thickness of the first short circuit plate and the strength of the material of the first short circuit plate is smaller than the product of the thickness of the second short circuit plate and the strength of the material of the second short circuit plate.

In one embodiment, the material of the first short circuit plate is equal or similar to the material of the second short circuit plate. A similar material means that the material of the first short circuit plate and the material of the second short circuit plate have the same chemical components with a different ratio (e.g. an alloy).

Referring to the materials of the first short circuit plate and the second short circuit plate, it may be disadvantageous to make the materials of the first short circuit plate 161 and the second short circuit plate different (i.e. also not similar) to each other in a case that the thickness of the first short circuit plate and the thickness of the second short circuit plate are the same. Because when the materials of the first short circuit plate and the second short circuit plate are different to each other, welding efficiency of the first short circuit plate, the second short circuit plate and cap plate is low.

In one embodiment, the second short circuit plate is formed with a material having strength higher than strength of material of the first short circuit plate. Here, the material of the second short circuit plate and the material of the first circuit plate may be equal, preferably aluminum alloys having different strengths.

According to the present invention, the expression strengths is understood as a compressive strength which is a limit state of compressive stress that leads to failure in the manner of brittle failure (rupture as the result of crack propagation).

In one embodiment, the second short circuit plate is thicker than the first short circuit plate.

Additionally, the short circuit assembly may include a connection plate spaced from the cap plate and oriented to be contacted by at least one of the first or second short circuit plate and the secondary battery may include a first insulation member between the cap plate and the connection plate. In one embodiment, the first insulation member has an opening generally aligned with the first short circuit plate and the second short circuit plate.

In one embodiment, the connection plate has an opening and a protrusion extending along a periphery of the opening and toward the first short circuit plate and the second short circuit plate. Additionally, the protrusion may have a beveled edge or a concave edge. In one embodiment, an edge of the protrusion is shaped to generally match a surface of the first or second short circuit plate that contacts the protrusion. Further, the first short circuit plate may have a coupling recess and the second short circuit plate may have a coupling protrusion within the coupling recess. A peripheral portion of the first short circuit plate and a peripheral portion of the second short circuit plate may be coupled together by a weld and may be made of aluminum. Further, the second short circuit plate may have a gas discharge opening. Referring to the position of the gas discharge opening, it is possible to form the gas discharge opening is formed at any position in the second short circuit plate. Preferably the gas discharge opening is formed in a central position in the second short circuit plate.

A secondary battery according to one embodiment includes the first short circuit plate having a first thickness T1, and the second short circuit plate having a second thickness T2 greater than the first thickness T1. Thus, when the first short circuit plate contacts the connecting plate to form a short circuit, even when heat generated from the short circuit melts the first short circuit plate, the second short circuit plate contacts the connecting plate to maintain a short circuit state.

Thus, according to one embodiment, even when the inner pressure caused by an over charge of the secondary battery is greater than a threshold pressure, a short circuit state is continually maintained, and thus, the fuse part continually functions as a fuse, thereby improving the safety of the secondary battery.

DETAILED DESCRIPTION

Example embodiments will now be described more fully hereinafter with reference to the accompanying drawings.

Figure 1:
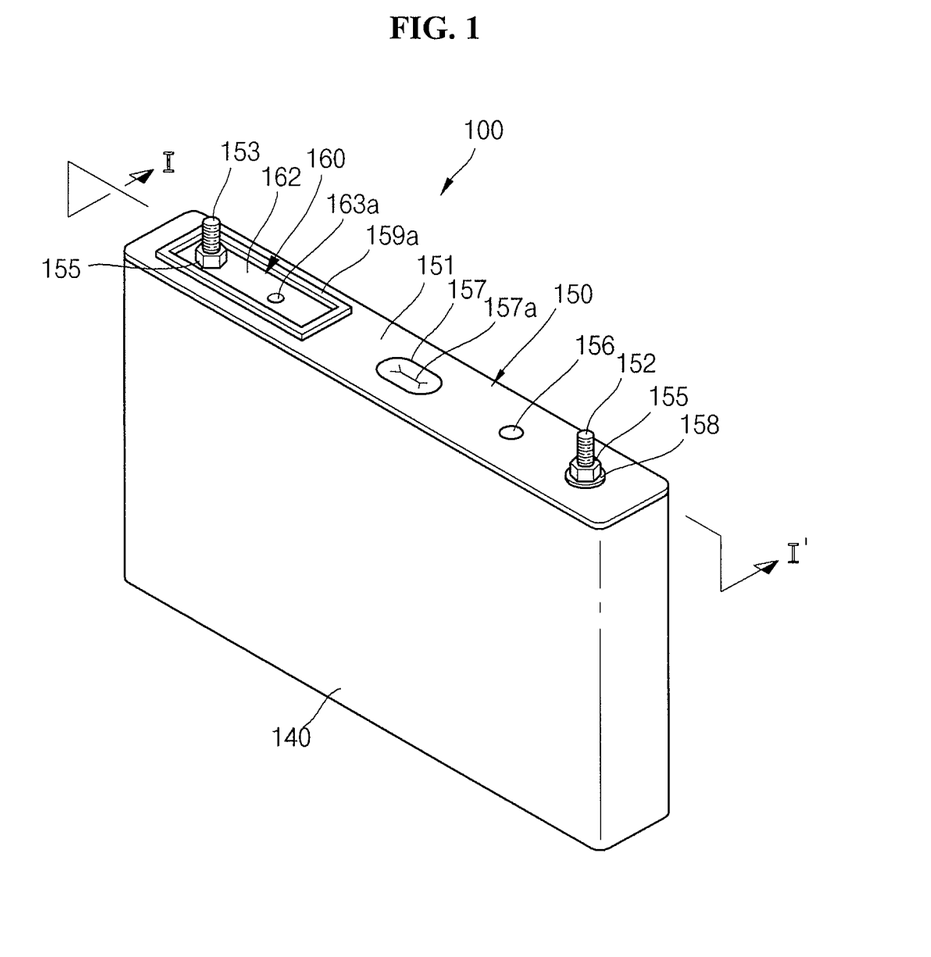
FIG. 1 is a perspective view illustrating a secondary battery according to an embodiment.
Figure 2:
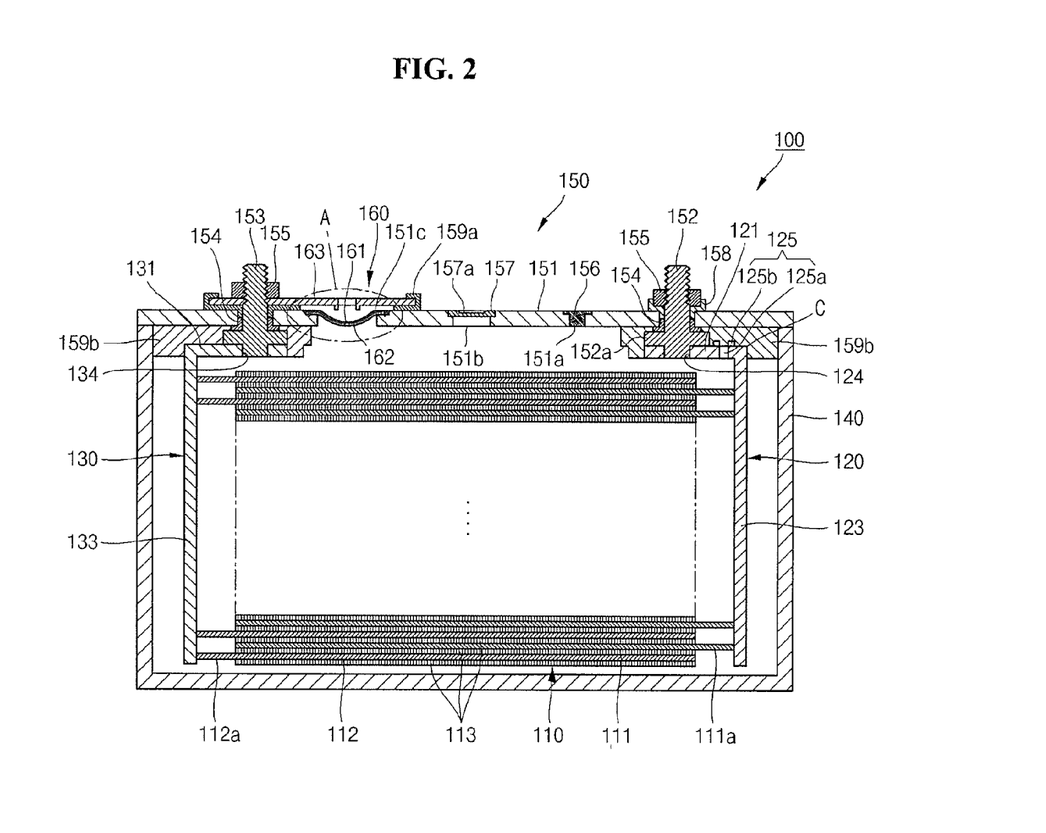
FIG. 2 is a cross-sectional view taken along line I-I' of FIG. 1.
Figure 3A:
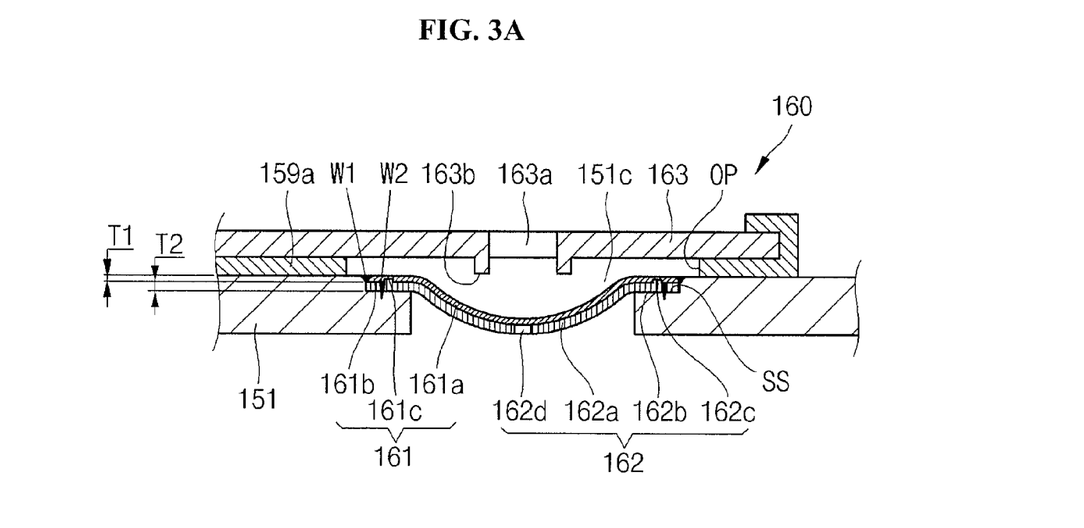
FIG. 3A is an enlarged view illustrating a portion A of FIG. 2.
Figure 3B:
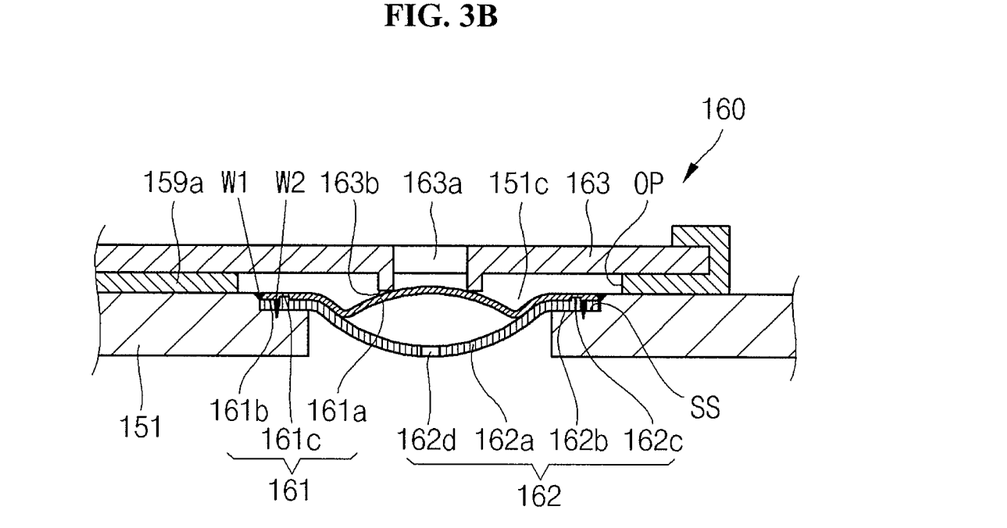
FIG. 3B is a cross-sectional illustrating a first short circuit plate of FIG. 3A contacting a connecting plate.
Figure 3C:
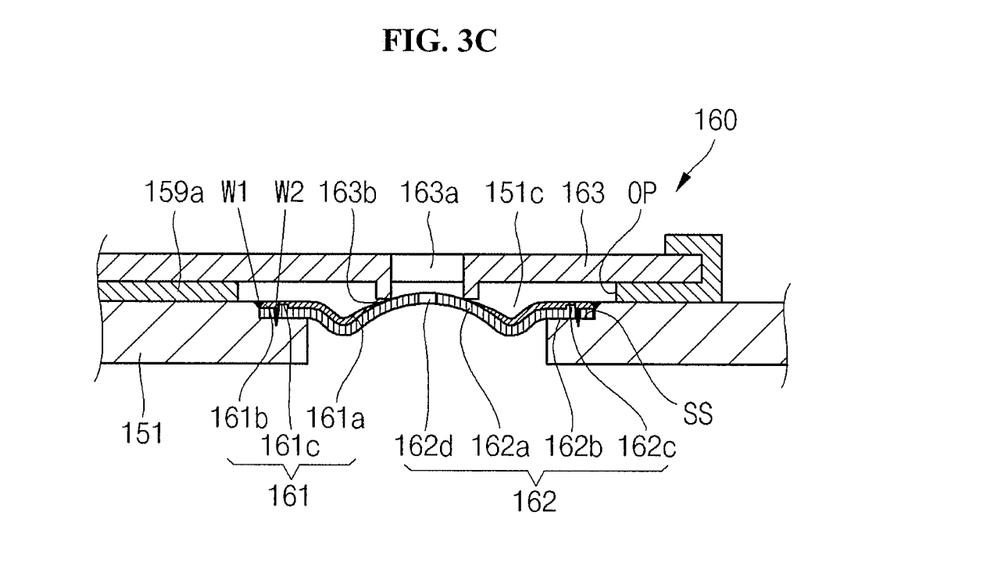
FIG. 3C is a cross-sectional illustrating a second short circuit plate of FIG. 3A contacting the connecting plate.

FIG. 1 is a perspective view illustrating a secondary battery according to an embodiment. FIG. 2 is a cross-sectional view taken along line I-I' of FIG. 1. FIG. 3A is an enlarged view illustrating a portion A of FIG. 2. FIG. 3B is a cross-sectional illustrating a state that a first short circuit plate of FIG. 3A contacts a connecting plate. FIG. 3C is a cross-sectional illustrating a state that a second short circuit plate of FIG. 3A contacts the connecting plate.

Referring to FIGS. 1 and 2, a secondary battery 100 according to an embodiment includes an electrode assembly 110, a first collecting plate 120, a second collecting plate 130, a case 140, a cap assembly 150, and a short circuit assembly 160.

The electrode assembly 110 is formed by winding or stacking a first electrode plate 111, a separator 113, and a second electrode plate 112, which have a thin plate or film shape. The first electrode plate 111 may function as a positive electrode, and the second electrode plate 112 may function as a negative electrode.

The first electrode plate 111 is formed by applying a first electrode active material such as a transition metal oxide on a first electrode collector formed of metal foil such as aluminum foil, and includes a first electrode non-coating portion 111a on which the first electrode active metal is not applied. The first electrode non-coating portion 111a functions as a passage for a current flowing between the first electrode plate 111 and the outside of the first electrode plate 111. The material of the first electrode plate 111 is not limited in the present invention.

The second electrode plate 112 is formed by applying a second electrode active material such as graphite or carbon on a second electrode collector formed of metal foil such as nickel or copper foil, and includes a second electrode non-coating portion 112a on which the second electrode active metal is not applied. The second electrode non-coating portion 112a functions as a passage for a current flowing between the second electrode plate 112 and the outside of the second electrode plate 112. The material of the second electrode plate 112 is not limited in the present invention. In one embodiment, the polarities of the first and second electrode plates 111 and 112 may be reversed.

The separator 113 is located between the first electrode plate 111 and the second electrode plate 112 to prevent a short circuit and allow the movement of lithium ions, and may be formed of polyethylene, polypropylene, or a combined film of polypropylene and polyethylene. However, the material of the separator 113 is not limited to those listed.

Both ends of the electrode assembly 110 are coupled to the first and second collecting plates 120 and 130 that are electrically connected respectively to the first and second electrode plates 111 and 112.

The first collecting plate 120 is formed of a conductive material such as aluminum, and contacts the first electrode non-coating portion 111a protruding from an end of the electrode assembly 110, thereby electrically connecting to the first electrode plate 111. Referring to FIG. 2, the first collecting plate 120 may include a first connecting part 121, a first extension 123, a first terminal hole 124, and a first fuse part 125.

The first connecting part 121 is provided in the form of a plate between the upper side of the electrode assembly 110 and the lower side of the cap assembly 150.

The first extension 123 is bent at an end of the first connecting part 121, and extends therefrom, and is provided in the form of a plate to substantially contact the first electrode non-coating portion 111a. The first connecting part 121 meets the first extension 123 at a corner C. The first connecting part 121 is substantially perpendicular to the first extension 123 at the corner C.

The first terminal hole 124 is located in a side part of the first connecting part 121 and a first electrode terminal 152 of the cap assembly 150 is fitted in the first terminal hole 124. The first terminal hole 124 of the first connecting part 121 is relatively far from the corner C.

The first fuse part 125 is located on the upper side of the electrode assembly 110, that is, on the first connecting part 121 so as not to contact electrolyte. The first fuse part 125 is located adjacent to the corner C not overlapping the first electrode terminal 152 coupled to the first terminal hole 124. In detail, the first fuse part 125 includes a first fuse hole 125a and a first reinforcement protrusion 125b protruding around the first fuse hole 125a. The first fuse hole 125a functions as a fuse. When a large current due to a short circuit formed in the secondary battery 100 generates heat, a region where the first fuse hole 125a is formed is molten by the heat to cut off a current flow. The first reinforcement protrusion 125b reinforces the region where the first fuse hole 125a is formed against external shock before a short circuit is formed in the secondary battery 100.

The second collecting plate 130 is formed of a conductive material such as nickel or copper, and contacts the second electrode non-coating portion 112a protruding from another end of the electrode assembly 112, thereby electrically connecting to the second electrode plate 112. The second collecting plate 130 includes a second connecting part 131, a second extension 133, and a second terminal hole 134.

Since the second connecting part 131, the second extension 133, and the second terminal hole 134 are substantially the same in shape and function as the first connecting part 121, the first extension 123, and the first terminal hole 124, a description thereof will be omitted.

The case 140 is formed of a conductive metal such as aluminum, aluminum alloy, or steel plated with nickel, and has an approximately hexahedron shape provided with an opening through which the electrode assembly 110, the first collecting plate 120, and the second collecting plate 130 are inserted. A periphery of the cap assembly 150 substantially extends along the opening, as shown in FIG. 2. The inner surface of the case 140 is treated to be electrically insulated from the electrode assembly 110, the first and second collecting plates 120 and 130, and the cap assembly 150. For example, the case 140 may have a polarity such as the positive polarity.

The cap assembly 150 is coupled to the case 140. In detail, the cap assembly 150 may include a cap plate 151, the first electrode terminal 152, a second electrode terminal 153, a gasket 154, and a nut 155. The cap assembly 150 may further include a plug 156, a vent plate 157, a connecting plate 158, an upper insulating member(or a first insulation member) 159a, and lower insulating members 159b.

The cap plate 151 closes the opening of the case 140, and may be formed of the same material as the case 140. The cap plate 151 may have an electrolyte injection hole 151a, a vent hole 151b, and a short circuit hole(or an opening) 151c. A side surface defining the short circuit hole 151c may have a stepped surface SS and a first short circuit plate 161 and a second short circuit plate 162 are located on the stepped surface SS. The cap plate 151 may have the same polarity as that of the case 140.

The first electrode terminal 152 passes through a side part of the cap plate 151 and electrically connects to the first collecting plate 120. The first electrode terminal 152 may be formed in a column shape, and includes an upper column exposed to the upper side of the cap plate 151, and a lower column located below the cap plate 151. A thread is formed on the outer circumferential surface of the lower column. The lower column includes a flange 152a to prevent the removal of the first electrode terminal 152 from the cap plate 151. A part of the first electrode terminal 152 below the flange 152a is fitted in the first terminal hole 124 of the first collecting plate 120. The first electrode terminal 152 may be electrically connected to the cap plate 151.

The second electrode terminal 153 passes through another side part of the cap plate 151 and electrically connects to the second collecting plate 130. Since the second electrode terminal 153 is substantially the same shape as the first electrode terminal 152, a description thereof will be omitted. Additionally, the second electrode terminal 153 is electrically insulated from the cap plate 151.

The gasket 154 is formed of an electrically insulated material, and is located between the cap plate 151 and each of the first and second electrode terminals 152 and 153 to seal the space between the cap plate 151 and each of the first and second electrode terminals 152 and 153. The gasket 154 prevents the entry of moisture into the secondary battery 100 or the leakage of the electrolyte from the secondary battery 100.

A nut 155 engages a thread formed on each of the first and second electrode terminals 152 and 153 to fix each of the first and second electrode terminals 152 and 153 to the cap plate 151.

The plug 156 closes the electrolyte injection hole 151a of the cap plate 151. The vent plate 157 is installed in the vent hole 151b of the cap plate 151 and has a notch 157a to be opened at a threshold pressure.

The linking plate 158 is located between the first electrode terminal 152 and the cap plate 151 and closely contacts the cap plate 151 and the gasket 154 by the nut 155. The first electrode terminal 152 is fitted in the linking plate 158 and the linking plate 158 electrically connects the first electrode terminal 152 to the cap plate 151.

The upper insulating member 159a is located between the second electrode terminal 153 and the cap plate 151, and closely contacts the cap plate 151 and the gasket 154. The second electrode terminal 153 is fitted in the upper insulating member 159a and the upper insulation member 159a electrically insulates the second electrode terminal 153 and the cap plate 151 from each other. Here, the upper insulating member 159a has an opening OP generally aligned with the first short circuit plate 161 and the second short circuit plate 162.

The lower insulation member 159b is located between the cap plate 151 and each of the first and second collecting plates 120 and 130 to prevent an unnecessary short circuit.

The short circuit assembly 160 is located at the upper portion of the cap assembly 150. When the inner pressure of the secondary battery 100 is greater than a threshold pressure caused by, for example, over charging of the secondary battery 100, the short circuit assembly 160 forms a short circuit, and thus, the first fuse part 125 cuts off a current flow. In one embodiment, the short circuit assembly 160 includes the first short circuit plate 161, the second short circuit plate 162, and a connecting plate 163.

Referring to FIG. 3A, the first short circuit plate 161 is installed on the short circuit hole 151c of the cap plate 151 using a method such as welding. The first short circuit plate 161 is provided in the form of a reversible plate. In detail, the first short circuit plate 161 includes a first round part 161a that protrudes convex downward (i.e., toward an interior of the case 140 in the direction of the electrode assembly 110); a first edge 161b that is fixed to the side surface defining the short circuit hole 151c, that is, to the stepped surface SS; and a coupling recess 161c formed in the lower surface of the first edge 161b. The cap plate 151 is electrically connected to the first short circuit plate 161. A weld part W1 is formed by welding at an end of the first edge 161b. That is, the end of the first edge 161b is welded to the cap plate 151 and the second short circuit plate 162. The first short circuit plate 161 may be formed of aluminum, but the present invention is not limited thereto. The first short circuit plate 161 may have a first thickness T1 ranging from about 0.3 mm to about 0.4 mm, so that the first short circuit plate 161 can be reversed. However, the present invention is not limited thereto.

When the inner pressure of the secondary battery 100 is greater than a first threshold pressure by over charging of the secondary battery 100, the first short circuit plate 161 is reversed and protrudes convex upward as illustrated in FIG. 3B (i.e., it protrudes away from an interior of the case 140 away from the electrode assembly 110), and contacts the connecting plate 163, thereby forming a short circuit. The short circuit causes a large current and heat and in this case, the first fuse part 125 functions as a fuse, thereby improving safety of the secondary battery 100. The first round part 161a of the first short circuit plate 161 may be in line contact with a protrusion 163b of the connecting plate 163.

The second short circuit plate 162 is installed in the short circuit hole 151c of the cap plate 151, and contacts the lower portion of the first short circuit plate 161. The second short circuit plate 162 has approximately the same size as the first short circuit plate 161 and overlaps with the first short circuit plate 161. The second short circuit plate 162 is a reversible plate. In detail, the second short circuit plate 162 includes a second round part 162a that is convex downward toward an interior of the case 140; a second edge 162*b* that is fixed to the side surface defining the short circuit hole 151*c*, that is, to the stepped surface SS; a coupling protrusion 162*c* formed on the upper surface of the second edge 162*b*; and a gas discharge hole (or a gas discharge opening) 162*d* formed in the second round part 162*a*. The cap plate 151 is electrically connected to the second short circuit plate 162. A weld part W2 is formed by welding on the outer part of the coupling protrusion 162*c* of the second edge 162*b*. That is, the outer part of the coupling protrusion 162*c* is welded to the cap plate 151. The second short circuit plate 162 may be formed of aluminum, but the present invention is not limited thereto. The upper surface of the second round part 162*a* contacts the lower surface of the first round part 161*a*. The upper surface of the second edge 162*b* contacts the lower surface of the first edge 161*b*. The lower surface of the second edge 162*b* contacts the stepped surface SS. The coupling protrusion 162*c* is coupled to the coupling recess 161*c*.

When the first short circuit plate 161 having the first thickness T1 that is relatively small contacts the connecting plate 163 and is molten or melted, the second short circuit plate 162 is reversed and protrudes convex upward and contacts the connecting plate 163 as illustrated in FIG. 3C, thereby maintaining a short circuit state. That is, even when the first short circuit plate 161 is molten or melted by heat, the second short circuit plate 162 contacts the connecting plate 163 and forms a short circuit to maintain a short circuit state, so that the first fuse part 125 can continually function as a fuse. When the first short circuit plate 161 is molten, gas is discharged from the secondary battery 100 through the gas discharge hole 162*d* to a portion where the first short circuit plate 161 is molten. Pressure created by the discharged gas reverses the second short circuit plate 162. Accordingly, the second short circuit plate 162 may have a second thickness T2 greater than the first thickness T1 such that the second short circuit plate 162 is reversed at the pressure of the gas discharged when the first short circuit plate 161 is molten, that is, at a second threshold pressure that is greater than the first threshold pressure. For example, the second thickness T2 may be from about 0.5 mm to about 0.6 mm.

The connecting plate 163 is spaced from the cap plate 151 outside the cap plate 151 and extends to cover the short circuit hole 151*c*. The second electrode terminal 153 is fitted in the connecting plate 163 which is electrically connected to the second electrode terminal 153. The connecting plate 163 has a flat upper surface and a flat lower surface and is formed of copper, but the present invention is not limited thereto. The connecting plate 163 may have a thickness from about 1 mm or greater, but the present invention is not limited thereto. The connecting plate 163 includes a hole(or an opening) 163*a* and the protrusion 163*b* in a region corresponding to the short circuit hole 151*c*.

When the first short circuit plate 161 or the second short circuit plate 162 contacts the connecting plate 163 to form a short circuit, the hole 163*a* maintains a constant current flow. That is, since a resistance is large in a contact region where the first short circuit plate 161 or the second short circuit plate 162 contacts the connecting plate 163, the hole 163*a* minimizes the resistance in the contact region.

The protrusion 163*b* is located on the lower surface of the connecting plate 163, that is, on a surface facing the first short circuit plate 161, and protrudes around the hole 163*a*. The protrusion 163*b* reduces the distance between the connecting plate 163 and the first short circuit plate 161 or the second short circuit plate 162 so that the connecting plate 163 can closely contact the first short circuit plate 161 or the second short circuit plate 162.

As described above, the secondary battery 100 according to the embodiment includes the first short circuit plate 161 having the first thickness T1, and the second short circuit plate 162 having the second thickness T2 greater than the first thickness T1. Thus, in the state where the first short circuit plate 161 contacts the connecting plate 163 to form a short circuit, even when heat generated from the short circuit melts the first short circuit plate 161, the second short circuit plate 162 contacts the connecting plate 163 to maintain a short circuit state.

Thus, according to the embodiment, even if the inner pressure caused by an over charge of the secondary battery 100 is greater than a threshold pressure, a short circuit state is continually maintained, and thus, the first fuse part 125 continually functions as a fuse, thereby improving the safety of the secondary battery 100.

Hereinafter, a secondary battery will now be described according to another embodiment.

Figure 4A:
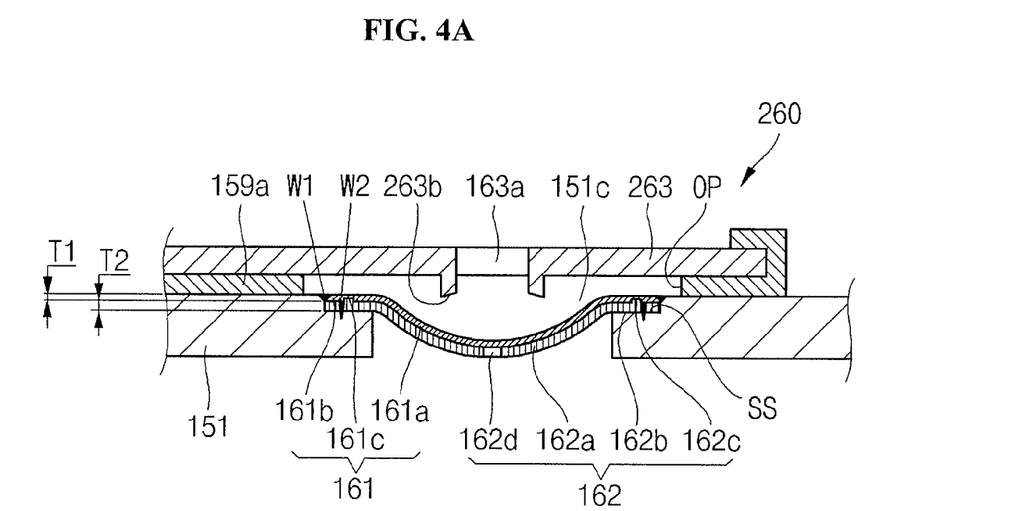
FIG. 4A is a cross-sectional view illustrating a portion of a secondary battery according to another embodiment which corresponds to the portion A of FIG. 2.
Figure 4B:
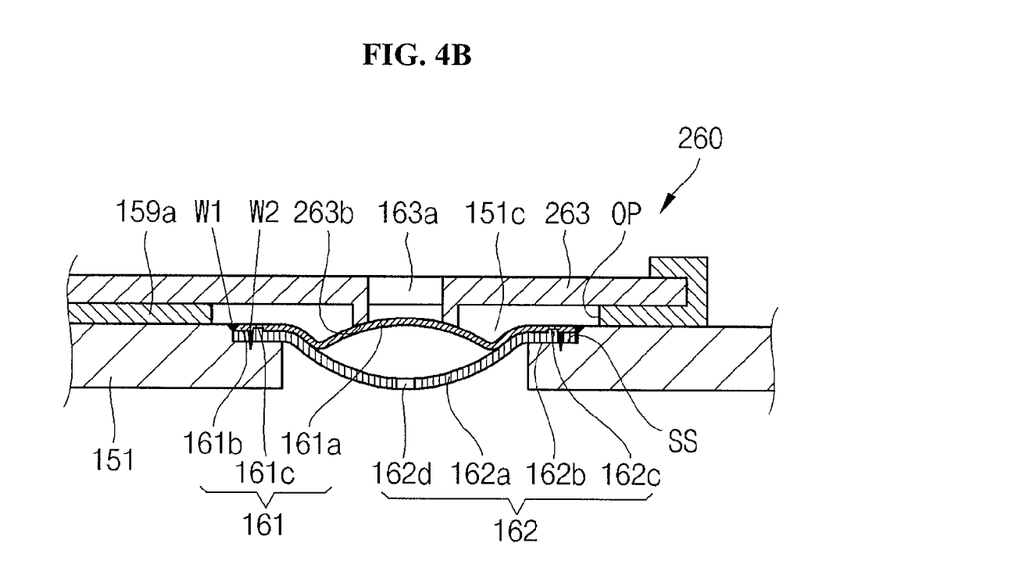
FIG. 4B is a cross-sectional illustrating a first short circuit plate of FIG. 4A contacting a connecting plate.
Figure 4C:
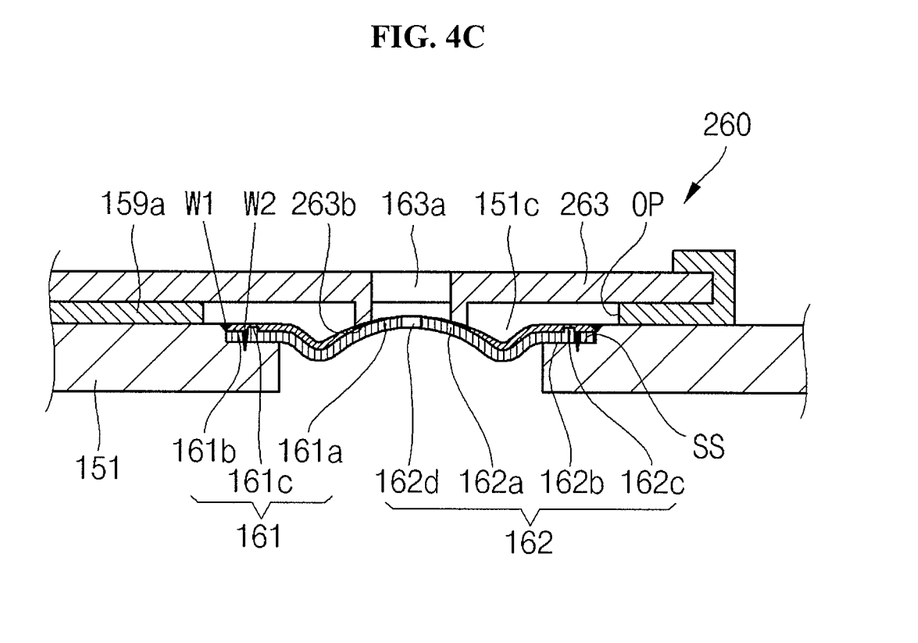
FIG. 4C is a cross-sectional illustrating a second short circuit plate of FIG. 4A contacting the connecting plate.

FIG. 4A is a cross-sectional view illustrating a portion of a secondary battery according to an embodiment, which corresponds to the portion A of FIG. 2. FIG. 4B is a cross-sectional illustrating a state that a first short circuit plate of FIG. 4A contacts a connecting plate. FIG. 4C is a cross-sectional illustrating a state that a second short circuit plate of FIG. 4A contacts the connecting plate.

The secondary battery according to the current embodiment is substantially the same in configuration and function as the secondary battery 100 illustrated in FIG. 2, except for a connecting plate 263 of a short circuit assembly 260. Thus, an illustration and a description of the same configuration will be omitted, and the connecting plate 263 will be principally described.

Referring to FIG. 4A, the short circuit assembly 260 includes the first short circuit plate 161, the second short circuit plate 162, and the connecting plate 263, which are formed of conductive materials.

The connecting plate 263 includes the hole 163*a* and a protrusion 263*b*, and is similar to the connecting plate 163 of FIG. 3A. However, a surface of the protrusion 263*b* facing the first short circuit plate 161 is concave or beveled. Thus, when the first short circuit plate 161 or the second short circuit plate 162 is reversed, the protrusion 263*b* is in surface contact (i.e., in contact along a length of the edge) with the first short circuit plate 161 or the second short circuit plate 162.

Referring to FIG. 4B, when the first short circuit plate 161 is reversed, the first short circuit plate 161 is in surface contact with the connecting plate 163 through the protrusion 263*b*, thereby reducing a resistance generated when the first short circuit plate 161 contacts the connecting plate 163. Accordingly, melting of the connecting plate 263 in a region where the first short circuit plate 161 contacts the connecting plate 263 can be reduced.

Referring to FIG. 4C, when the first short circuit plate 161 is molten, and the second short circuit plate 162 is reversed, the connecting plate 263 is in surface contact with the second short circuit plate 162 through the protrusion 263*b*, thereby reducing a contact resistance between the second short circuit plate 162 and the connecting plate 263. Accordingly, a short circuit formed by the second short circuit plate 162 and the connecting plate 263 can be maintained more efficiently.

As described above, according to the current embodiment, the connecting plate 263 includes the protrusion 263*b* that is in surface contact with the first short circuit plate 161 or the second short circuit plate 162, thereby reducing the melting of the first short circuit plate 161 due to heat, and more efficiently maintaining a short circuit formed by the second short circuit plate 162. Thus, according to the embodiment, when the secondary battery 100 is over charged, the first fuse part 125 continually functions as a fuse, thereby improving the safety thereof.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

| INDEX WORD | | | |
|---|---|---|---|
| 100: | Secondary Battery | 110: | Electrode Assembly |
| 120: | First Collecting Plate | 130: | Second Collecting Plate |
| 140: | Case | 150: | Cap Assembly |
| 160 and 260: | Short circuit assembly | 161: | First Short Circuit Plate |
| 162: | Second Short Circuit Plate | 163 and 263: | Connecting Plate |

What is claimed is:

1. A secondary battery comprising:
an electrode assembly;
a case housing the electrode assembly;
a cap assembly sealing the case, the cap assembly comprising a cap plate; and
a short circuit assembly comprising:
a first short circuit plate having an edge portion coupled to the cap plate; and
a second short circuit plate having an edge portion coupled to the cap plate,
wherein the second short circuit plate is thicker than the first short circuit plate.

2. The secondary battery of claim 1, wherein the first short circuit plate has a round portion generally protruding towards an interior portion of the case and wherein the second short circuit plate has a round portion generally protruding towards an interior portion of the case.

3. The secondary battery of claim 2, wherein the first short circuit plate is configured to protrude away from the inner portion of the case when an internal pressure of the secondary battery reaches a first threshold level.

4. The secondary battery of claim 3, wherein the second short circuit plate is configured to protrude away from the inner portion of the case when the internal pressure of the secondary battery reaches a second threshold level that is greater than the first threshold level.

5. The secondary battery of claim 1, wherein the first short circuit plate and the second short circuit plate contact each other.

6. The secondary battery of claim 1, wherein the first short circuit plate and the second short circuit plate overlap.

7. The secondary battery of claim 1, wherein the cap plate has an opening and a stepped surface SS adjacent to the opening, and wherein the first short circuit plate and the second short circuit plate are on the stepped surface.

8. The secondary battery of claim 1, wherein the short circuit assembly further comprises a connection plate spaced from the cap plate and oriented to be contacted by at least one of the first or second short circuit plate.

9. The secondary battery of claim 8, further comprising a first insulation member between the cap plate and the connection plate.

10. The secondary battery of claim 9, wherein the first insulation member has an opening generally aligned with the first short circuit plate and the second short circuit plate.

11. The secondary battery of claim 8, wherein the connection plate has an opening and a protrusion extending along a periphery of the opening and toward the first short circuit plate and the second short circuit plate.

12. The secondary battery of claim 11, wherein the protrusion has a beveled edge or a concave edge.

13. The secondary battery of claim 11, wherein an edge of the protrusion is shaped to generally match a surface of the first or second short circuit plate that contacts the protrusion.

14. The secondary battery of claim 1, wherein the first short circuit plate has a coupling recess and wherein the second short circuit plate has a coupling protrusion within the coupling recess.

15. The secondary battery of claim 1, wherein a peripheral portion of the first short circuit plate and a peripheral portion of the second short circuit plate are coupled together by a weld.

16. The secondary battery of claim 1, wherein the first and second short circuit plates comprise aluminum.

17. The secondary battery of claim 1, wherein the second short circuit plate has a gas discharge opening.

* * * * *